April 18, 1961  S. P. CLURMAN  2,979,959
MAGNETIC ACCELEROMETER
Filed June 3, 1959
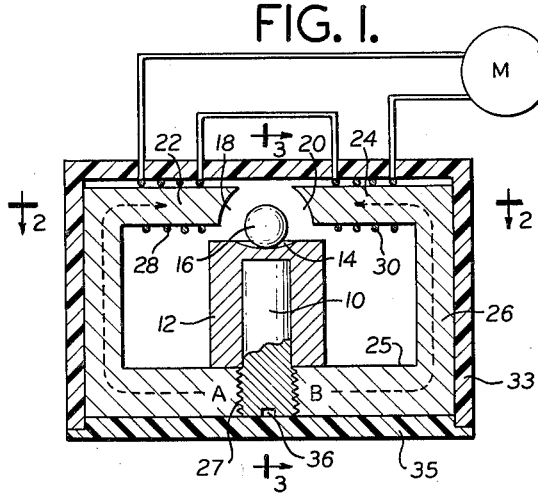
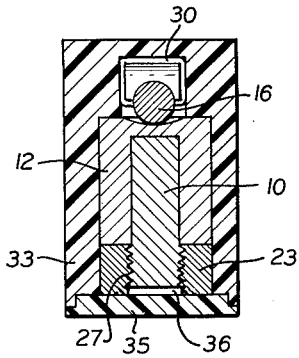
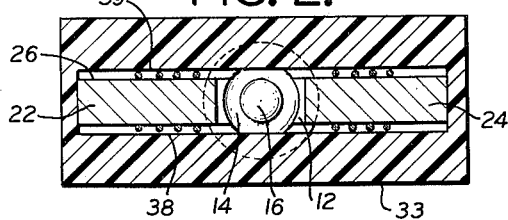
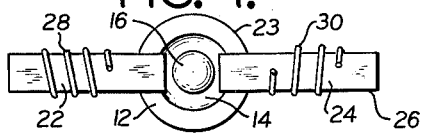
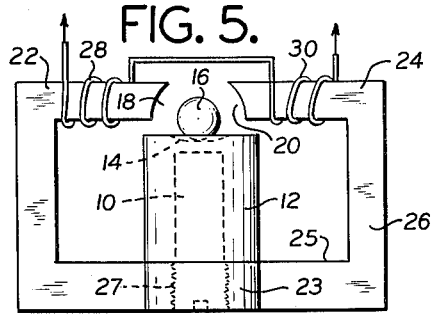
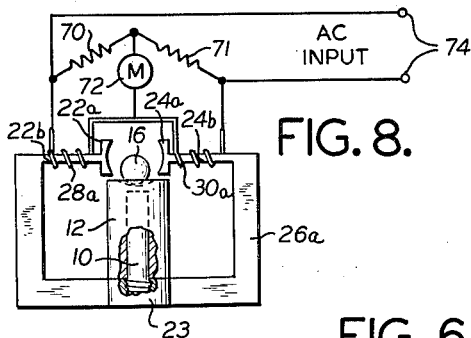
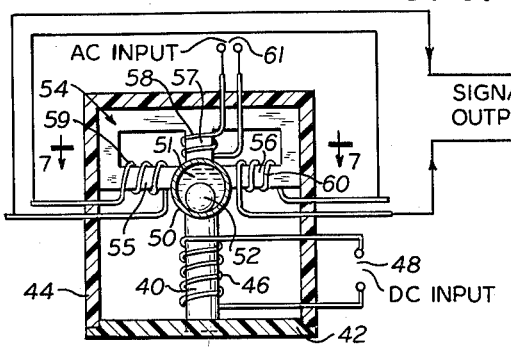
INVENTOR
STANLEY P. CLURMAN
BY J. B. Burke
ATTORNEY.

United States Patent Office 2,979,959
Patented Apr. 18, 1961

2,979,959

MAGNETIC ACCELEROMETER

Stanley P. Clurman, 258 Matilda Ave.,
New Brunswick, N.J.

Filed June 3, 1959, Ser. No. 817,839

12 Claims. (Cl. 73—516)

This invention relates to the art of accelerometers and more particularly concerns a magnetic type of accelerometer.

According to the invention there is provided a magnetic ball mounted for oscillatory movement in a non-magnetic concave seat after being subjected to a force of acceleration or deceleration. The ball oscillates in a magnetic field maintained by a magnet which exerts a restoring force on the ball in the seat. Disposed near the ball but spaced therefrom are magnetic poles on which are wound coils. The coils are connected together and terminate at a meter or other device for measuring a pulsating output signal produced by the device. The oscillatory movement of the magnetic ball in the magnetic field changes the distribution of magnetic flux therein to produce desired indications of the instrument.

It is therefore an object of the invention to provide an accelerometer in which a magnetic ball is oscillatory in a magnetic field, to vary the magnetic reluctance between adjacent magnetic poles, the poles carrying interconnected coils connected to an indicator for measuring magnitude of oscillatory displacement of the ball and the magnitude of the force which initiated such displacement.

It is a further object to provide an accelerometer of the character described, wherein the coils are connected in series so that the pulsating output voltages produced thereby represent the sum of the variations in the individual coils.

It is a further object to provide an accelerometer in which a magnetic ball oscillates in a magnetic field adjacent to magnetic poles of a transformer having secondary coils connected in series so that the pulsating output voltages produced thereby represent the differences of the variations in the individual coils.

A still further object is to provide an accelerometer in which signal coils are connected as elements of an impedance bridge, with a movable magnetic ball disposed adjacent thereto to change the impedances of the coils in opposite phase, the bridge producing an output signal which depends on the amplitude of ball displacement.

The invention will be best understood from the following description taken together with the drawing, wherein:

Fig. 1 is an elevational sectional view through an accelerometer embodying the invention, showing magnetic elements enclosed in a casing.

Fig. 2 is a horizontal sectional view taken on line 2—2 of Fig. 1.

Fig. 3 is a vertical sectional view taken on line 3—3 of Fig. 1.

Fig. 4 is a top plan view of magnetic elements of the device with casing removed.

Fig. 5 is an elevational view of the magnetic elements of the device with casing removed.

Fig. 6 is an elevational sectional view of another accelerometer embodying the invention.

Fig. 7 is a horizontal sectional view taken on line 7—7 of Fig. 6.

Fig. 8 is an elevational view, partially schematic in form of still another accelerometer according to the invention.

Referring to Figs. 1–5, there is shown a cylindrical permanent magnet 10 inserted in a cylindrical inverted cup shaped member 12. Member 12 has a horizontal top formed with a concave recess 14 providing a seat for a ball 16. The ball is made of steel or other magnetic material. Member 12 may be made of aluminum, brass, bronze or other non-magnetic material. The ball 16 is held on the seat 14 in a magnetic field maintained by magnet 10. Disposed adjacent to the ball but spaced therefrom by air gaps 18 and 20 are magnetic poles 22, 24. The poles are located at one side of a flat rectangular magnetic core structure 26. The magnet 10 extends transversely across the structure 26 so that two magnetic circuits A and B exist through the respective halves of the structure 26. Each circuit has half the magnetic flux and magnetic field strength of magnet 10. Wound on poles 22 and 24 are coils 28 and 30. The coils are connected in series and may be connected to a voltage measuring device such as meter 32. The magnetic structure 26 may be provided with an annular or ring shaped portion 23 in side 25 in which may be engaged the threaded end 27 of the magnet.

The magnetic core structure is removably disposed in a non-magnetic casing 33 having a detachable base or cover 35. The magnet may be slotted as shown at 36 for securing the magnet into the structure 26.

To operate the device, it will be disposed vertically as shown in the drawing and subjected to a horizontal force of acceleration or deceleration parallel to the plane of the magnetic structure. The ball will then be constrained to move in a vertical plane including the direction of said force by the adjacent parallel inner walls 38 and 39 of the casing. After the accelerating force ceases, the ball rolls in oscillatory fashion from side to side on seat 14 closer to one of the poles and further from the other and vice versa as the magnet exerts a restoring force on the ball. This mechanical oscillation increases the magnetic flux in each pole as it is approached by the ball while it decreases the magnetic flux in the remaining pole. The coils 28 and 30 are connected in series aiding fashion, so that a pulsating output voltage is measured by meter 32 which is the sum of the voltages generated in the respective coils. The meter thus provides a measure of a transient acceleration applied to the ball after the acceleration has ceased. The magnet 10 exerts a restoring force on the ball during its oscillatory displacement on seat 14.

In the form of the invention shown in Figs. 6 and 7, a cylindrical bar magnet 40 is supported in base 42 of a non-magnetic casing 44. A coil 46 is wound on the bar and connected to a source of D.C. current 48 to permanently magnetize the bar 40. On bar 40 is disposed a closed flat cylindrical container 50 which is filled with an oil or other vibration damping fluid 51. In the container is a magnetic ball 52. The ball rolls in an oscillatory manner on the concave curved inner side of the container in a magnetic field maintained by the magnet 40. The magnet exerts a restoring force on the ball as it oscillates on its concave seat. A rectangular magnetic core structure 54 has two aligned poles 55 and 56 spaced apart by an air gap. The container 50 is disposed between the ends of poles 55, 56 in the air gap. A third pole formed by a transversely extending arm 57 of the structure 54 is disposed in alignment with magnet 40 at the top of the container. Coils 58, 59 and 60 are wound on the respective poles. Coil 58 may be connected to a source 61 of alternating current. Coils 59 and 60 are connected to each other in series but are oppositely phased so that they produce additive net voltages.

Any displacement of the ball 52 on its seat increases the magnetic coupling between pole 57 and one of poles 55 or 56 while decreasing the magnetic coupling between pole 57 and the other of the two poles. The coil 58 serves as the primary winding of a transformer. The coils 59 and 60 are secondary transformer windings. As the ball oscillates or rolls to and fro between poles 55, 56 there is produced at the output terminals of the secondary circuit a pulsating voltage due to the oscillatory displacement of the ball. This voltage is equal in amplitude to the sum of the voltage variations in the two coils. The output voltage is amplitude modulated although it has the same frequency as that of the alternating current in the primary coil 58. This amplitude modulated differential transformer output voltage may be applied to a meter 65 which then provides an indication of the oscillatory ball displacement initiated by an accelerating or decelerating force directed to the ball in the vertical plane of the applied force. The damping fluid 51 prevents slight spurious vibrations and movements of the ball on the seat. The restoring force of the magnet on the ball as it rolls from side to side on the curved seat subsequent to its initial displacement by the accelerating force causes the oscillatory movement of the ball.

It is possible to connect the output signal coils of the device as elements of an impedance bridge. This is illustrated in Fig. 8 in which meter 72 is connected across one diagonal of a bridge including equal resistors 70, 71 and coils 28a, 30a both having the same number of turns. The meter 72 is connected across one diagonal of the bridge including one resistor and one coil in each half of the bridge. An A.C. source of current is applied at terminals 74 connected across the other diagonal of the bridge including the resistors in series in one half the bridge and the two coils connected in series in the other half of the bridge. The meter 72 indicates the extent of ball displacement.

Fig. 8 also illustrates the use of the device including a saturable reactor associated with the bridge. The magnetic core structure 26a is similar to the structure 26 of Figs. 1–5, except that poles 22a and 24a have very thin cores 22b, 24b as compared to the width of the remainder of the magnetic structure. When ball 16 approaches one of the poles 22a or 24a, more magnetic flux is concentrated in the approached pole so that it approaches magnetic saturation. The coil on the saturated pole or core will have a reduced inductance as compared with the other coil. This will increase the degree of bridge unbalance. The meter 72 will indicate the extent of both maximum and average unbalance and this will be a measure of displacement of the oscillating ball and of the force of acceleration or deceleration which initiated oscillatory displacement of the ball. Obviously the poles 20, 22; 20a, 22a; and 55, 56 should be so spaced from the magnets 10 and 40 that the ball does not contact any pole at any time after it is displaced by an accelerating or decelerating force, in order that the entire force imparted to the ball in a direction perpendicular to the restoring force of the magnet may be converted to kinetic energy opposed by the restoring force. These opposing forces result in the oscillatory displacement of the ball upon which the operation of the device depends.

The various forms of the device disclosed are capable of a wide range of adjustability after manufacture. This may be done by changing the magnetic attraction on the ball and thus varying the sensitivity of the instrument. When the device employs an electromagnet such as shown in Fig. 6, merely changing the magnetizing current applied at terminals 48 will change the magnetic field applied to the ball 52 and thus vary the restoring force thereon. Where a permanent magnet is used, iron slugs of various thickness may be inserted in the ring shaped portion 23 of the magnetic structure. The slugs may be rotatable to change the reluctance of the magnetic flux path or may be axially adjustable to change an air gap between the fixed magnet and the slug. The magnet can of course be clamped in different positions in the magnetic structure.

While I have disclosed a limited number of embodiments of the invention, I do not intend the invention to be limited or restricted thereto. The invention is to be limited only by the scope of the appended claims.

What is claimed and sought to be protected by Letters Patent of the United States is:

1. An accelerometer, comprising a generally rectangular magnetic core structure, said structure having a gap between pole portions thereof, a movable magnetic ball, concave means supporting said ball in said gap, guide means permitting movement of the ball in only one plane upon application of an accelerating force toward one of said pole portions and away from another of said portions in said pole gap, magnet means exerting a restoring force on said ball and maintaining a magnetic field through said gap, said field being divided in said core, and coils connected in series and wound upon the respective pole portions, whereby oscillatory displacement of said ball on the support means produces a voltage at terminals of the coils which voltage is the sum of the voltages induced in the respective coils during the oscillatory displacement of said ball, said core structure having a further pole portion at said gap, another coil wound on said further pole portion, means for applying alternating current to said other coil to induce voltages in the first named coils, and means for measuring said voltages to determine the magnitude of said force.

2. An accelerometer, comprising a generally rectangular magnetic core structure, said structure having a gap between pole portions thereof, a movable magnetic ball, means supporting said ball in said gap and permitting movement of the ball in a single plane upon application of a force toward one of said pole portions and away from another of said pole portions, said means being a closed cylindrical container having a fluid therein for damping spurious vibrations of said ball, magnet means maintaining a magnetic field in said core and through said gap and exerting a restoring force on said ball, said field being divided in said pole portions, coils connected in series and wound upon the respective portions, said core structure having a further pole portion at said gap, another coil wound on said further pole portion, means for applying alternating current to said other coil to induce voltages in the first named coils, whereby oscillatory displacement of said ball in the container initiated by said force produces a voltage at terminals of said coils which voltage is the sum of the voltages induced in the respective coils during displacement of said ball.

3. An accelerometer according to claim 2, further comprising means connected to said terminals for measuring the voltage at the terminals to determine the magnitude of said force.

4. An accelerometer, comprising a generally rectangular magnetic core structure, said structure having a gap between pole portions thereof, a magnetic ball, concave means supporting said ball near said gap, means permitting movement of the ball in only a single plane upon application of an accelerating force toward one of said portions and away from another of said portions in said gap, a magnet maintaining a magnetic field in said core and through said gap and exerting a restoring force on said ball, coils connected in series and wound upon the respective portions, whereby oscillatory displacement of said ball on the support means produces a voltage at terminals of the coils which voltage is the sum of the voltages induced in the coils during the oscillatory displacement of said ball, a pair of equal resistors connected in series and having two terminals connected to terminals of said coils to constitute a balanced bridge circuit therewith, means for applying an alternating current to one diagonal of said bridge circuit, and an indicator connected to another diagonal of said bridge circuit, whereby said indicator shows the extent of displacement of said ball.

5. An accelerometer, comprising a generally rectangular magnetic core structure, said structure having a gap between aligned pole portions thereof, a magnetic ball, means supporting said ball near said gap, said means including a concave seat for the ball permitting movement of the ball upon application of a force thereto, means guiding movement of the ball in a single plane, a magnetized member maintaining a magnetic field in said core in two magnetic circuits each including one of said pole portions, said field encompassing said gap, conductive coils connected in series and wound respectively upon said pole portions, each of said pole portions being thinner than the remainder of said structure, whereby oscillatory displacement of said ball in said gap tends to cause magnetic saturation of one of the pole portions and reduces inductance of the coil thereon while the inductance of the other coil on the other pole portion is correspondingly increased.

6. An accelerometer, comprising a generally rectangular magnetic core structure, said structure having a gap between aligned pole portions thereof, a magnetic ball, means supporting said ball near said gap and permitting rolling movement of the ball in a single plane upon application of a force thereto, a magnet exerting a restoring force on said ball and maintaining a magnetic field in said core and gap, electrically conductive coils connected in series and wound in opposite phase upon said pole portions, each of said pole portions being thinner than the remainder of said structure, a pair of equal resistors connected in series and having two terminals connected to terminals of said coils to constitute a balanced bridge circuit therewith, means for applying an alternating current to one diagonal of said bridge circuit, and an indicator connected to another diagonal of said bridge circuit, whereby said indicator provides an indication of the extent of displacement of said ball by said force.

7. An accelerometer, comprising a magnetic core structure having a plurality of poles, a concave seat spaced from said poles, a magnetic ball movably disposed on said seat, means constraining the ball to move in a single plane on said seat, coils connected in series and wound on the poles respectively, and a bar magnet adjacent to said seat and exerting a restraining and restoring force on the ball, said bar magnet maintaining a magnetic field extending through said seat and divided between said poles, whereby oscillatory movement of said ball on said seat initiated by a force of acceleration imparted to the ball produces in said coils a pulsating voltage whose amplitude is proportional to said force.

8. An accelerometer, comprising a magnetic core structure having a plurality of poles, a concave seat spaced from said poles, a magnetic ball movably disposed on said seat, means constraining the ball to move in a single plane on said seat, coils connected in series and wound on the poles respectively, an indicator in circuit with said coils, and a bar magnet adjacent to said seat and exerting a restraining and restoring force on the ball, said bar magnet maintaining a magnetic field extending through said seat and divided between said poles, whereby oscillatory movement of said ball on said seat initiated by a force of acceleration imparted to the ball produces in said coils a pulsating voltage whose amplitude is proportional to said force, said indicator indicating the amplitude of said pulsating voltage.

9. An accelerometer, comprising a core structure, said structure having a plurality of poles with a gap therebetween, a movable magnetic ball, concave support means supporting said ball for movement in said gap, means guiding movement of the ball in one plane toward and away from said poles upon application of a displacing force, and a magnet maintaining a magnetic field through said gap, said field being divided between said poles, said magnet exerting a restoring force on said ball greater than any attractive force exerted by either of said poles, and coils wound upon the respective cores and connected in series, whereby oscillatory displacement of the ball on said support means subsequent to application of said force produces a voltage at terminals of the coils, which voltage is the sum of the voltages induced in the respective coils during said oscillatory displacement.

10. An accelerometer according to claim 9, further comprising a pair of equal resistors connected in series and having two terminals connected to terminals of said coils to constitute a balanced bridge circuit therewith, means for applying alternating current to one diagonal of said bridge circuit, and an indicator connected to another diagonal of said bridge circuit, whereby said indicator shows the extent of displacement of said ball.

11. An accelerometer according to claim 9, further comprising a pair of resistors connected in series and having two terminals connected to terminals of said coils to constitute a bridge circuit therewith, means for applying an alternating current to one diagonal of said bridge circuit, and an indicator connected to another diagonal of said bridge circuit, whereby said indicator provides an indication of the extent of displacement of said ball by said force.

12. An accelerometer according to claim 9, wherein each of said poles has a portion of reduced thickness, whereby the oscillatory displacement of the ball tends to cause magnetic saturation of one of the poles and reduces inductance of the coil thereon while the inductance of the other coil on the other pole is correspondingly increased.

References Cited in the file of this patent

UNITED STATES PATENTS

| 799,305 | Crouch et al. | Sept. 12, 1905 |
| 2,052,205 | Baughman | Aug. 25, 1936 |
| 2,466,028 | Klemperer | Apr. 5, 1949 |
| 2,552,722 | King | May 15, 1951 |
| 2,643,869 | Clarke | June 30, 1953 |
| 2,860,313 | Israel | Nov. 11, 1958 |
| 2,888,530 | Horton | May 26, 1959 |

FOREIGN PATENTS

| 759,585 | Great Britain | Oct. 24, 1956 |